US007498274B2

(12) United States Patent
Flint et al.

(10) Patent No.: US 7,498,274 B2
(45) **Date of Patent: *Mar. 3, 2009**

(54) COMPOSITE PACKING MATERIAL FOR USE IN OFFSET LITHOGRAPHY AND METHOD OF MAKING

(75) Inventors: W. Toriran Flint, Asheville, NC (US); Joseph L. Byers, Inman, SC (US)

(73) Assignee: Day International, Inc., Dayton, OH (US)

( * ) Notice: Subject to any disclaimer, the term of this patent is extended or adjusted under 35 U.S.C. 154(b) by 294 days.

This patent is subject to a terminal disclaimer.

(21) Appl. No.: 11/129,111

(22) Filed: May 13, 2005

(65) Prior Publication Data

US 2005/0255767 A1 Nov. 17, 2005

Related U.S. Application Data

(60) Provisional application No. 60/571,215, filed on May 14, 2004.

(51) Int. Cl.
*B32B 27/14* (2006.01)
*B32B 27/04* (2006.01)

(52) U.S. Cl. ............................ 442/2; 442/38; 442/203; 442/313

(58) Field of Classification Search .................... 442/2, 442/38, 203, 313
See application file for complete search history.

(56) References Cited

U.S. PATENT DOCUMENTS

| | | | |
|---|---|---|---|
| 4,452,143 A | 6/1984 | Heinemann et al. | |
| 4,537,129 A | 8/1985 | Heinemann et al. | |
| 4,615,934 A * | 10/1986 | Ellison | 442/313 |
| 4,656,080 A | 4/1987 | Takahashi et al. | |
| 5,364,683 A | 11/1994 | Flint et al. | |
| 5,498,470 A | 3/1996 | McLean et al. | |
| 5,549,968 A | 8/1996 | Byers et al. | |
| 6,572,703 B1 | 6/2003 | Crouch et al. | |

FOREIGN PATENT DOCUMENTS

| | | |
|---|---|---|
| DE | 199 52 802 A | 5/2001 |
| GB | 2 045 163 A | 10/1980 |

* cited by examiner

*Primary Examiner*—Ula C Ruddock
(74) *Attorney, Agent, or Firm*—Dinsmore & Shohl LLP

(57) ABSTRACT

A composite packing material for use with a printing blanket is provided including a substrate such as fabric, scrim, or film which is coated on at least one surface with a polymeric compound to provide the desired gauge to the printing blanket assembly. The resulting composite packing material has a thickness of about 0.010 to about 0.067 inches (0.25 mm to 1.7 mm) and is substantially volume non-compressible.

5 Claims, 1 Drawing Sheet

COMPOSITE PACKING MATERIAL FOR USE IN OFFSET LITHOGRAPHY AND METHOD OF MAKING

CROSS REFERENCE TO RELATED APPLICATIONS

This application claims the benefit of U.S. Provisional Application No. 60/571,215, entitled COMPOSITE PACKING MATERIAL FOR USE IN OFFSET LITHOGRAPHY AND METHOD OF MAKING, filed May 14, 2004. The entire contents of said application are hereby incorporated by reference.

BACKGROUND OF THE INVENTION

The present invention relates to a non-compressible composite packing material for use with a printing blanket in offset lithography, and more particularly, to an improved packing material including a polymeric compound on at least one surface which provides the desired gauge to the printing blanket assembly.

One of the most common commercial printing processes is offset lithography, in which a rotary cylinder covered with a printing plate having an image area receptive to and covered by ink is rotated so that its surface contacts a second cylinder covered with an ink-receptive printing blanket. The ink on the image surface of the printing plate transfers, or offsets, to the surface of the blanket, and paper is passed between the blanket covered cylinder and a back-up cylinder to transfer the image from the surface of the blanket to the paper.

During the step in which the image is transferred from the plate to the blanket and from the printing blanket to the paper, it is important to have intimate contact between the contacting surfaces. This is ordinarily achieved by positioning the cylinders so that there is a fixed interference between the contacting surfaces so that the blanket is compressed throughout the run to a fixed depth. In one known method, this fixed interference is accomplished by inserting one or more non-compressible packing materials between the blanket and/or plate and the surface of the cylinders on which they are mounted to build up the thickness of the blanket and/or plate, providing even gauge and adjusting the pressure necessary to achieve good ink transfer.

Conventional, non-compressible packing materials used under the blanket have comprised relatively thin layers of polyester such as Mylar or calendered paper. However, multiple layers of these packing materials may be required in order to build the surface of the blanket to achieve sufficient interference fit. This causes numerous handling and installation problems and requires additional time for installation. Further, once positioned on the blanket cylinder, these packing materials often tend to slip or slide, which may render the blanket surface non-uniform and result in poor print quality. Non-compressible composite packing materials comprising one or more layers of woven fabric, rubber-based adhesives and rubber-based surface layers have been developed which have a greater thickness than paper packing materials. However, such composite packing materials are expensive to produce due to the traditional manufacturing methods of multiple pass, knife coating of the rubber-based adhesive and surface layers and the high cost of the woven fabrics used. Such composite packing materials frequently require at least two layers of fabric to achieve the necessary low elongation, high tensile strength properties. Further, the woven fabrics used in current composite packing materials are oriented such that the required properties are achieved in only one direction (typically the machine direction). In addition, composite packing materials suffer from gauge loss during use due to the poor compression set properties of the rubber based compounds used and the woven fabrics themselves. Thus, the life of the composite packing materials is reduced as the materials tend to lose gauge (i.e., thickness) during operation.

Accordingly, there is still a need in the art for a low-cost, non-compressible, non-directional packing material having a thickness which is sufficient to be installed without the need for multiple layers, and which maintains its gauge over its useful life.

SUMMARY OF THE INVENTION

The present invention meets that need by providing a non-compressible, non-directional composite packing material having a thickness of from about 0.010 inches (0.25 mm) to about 0.67 inches (1.7 mm) which can be installed as a single integral packing. The composite packing material is low in cost and maintains its gauge over its useful life.

According to one aspect of the present invention, an integral composite packing material for use with a printing blanket is provided comprising a substrate selected from the group consisting of fabric, scrim, and film. The substrate has first and second surfaces and includes a polymeric compound on at least one of the first and second surfaces. Preferably, the polymeric compound is included on both the first and second surfaces. The composite packing material has a substantially uniform thickness throughout. By "substantially uniform thickness," we mean that the thickness varies only about ±0.001 inches (0.025 mm). Further, the surface of the polymeric compound is preferably substantially smooth and free of embossments, dimples, or other surface imperfections.

The substrate is preferably a fabric selected from weft insertion fabric, woven fabric, and non-woven fabric. Preferably, the substrate comprises a weft insertion fabric comprising yarns of at least 1000 denier.

The polymeric compound is selected from polyvinyl chloride, thermoplastic elastomers (TPEs), urethanes, compounded synthetic rubbers, and blends thereof. Preferably, the polymeric compound has a compression set of less than about 25, more preferably, less than about 10, and most preferably, less than about 4. By compression set, it is meant the measure of a composition's failure to return to its original thickness after being compressed to a specific thickness for a specific amount of time. Preferably, the polymeric compound comprises polyvinyl chloride having a Shore A hardness of from about 60 to about 80.

The composite packing material may be easily manufactured by providing a substrate selected from fabric, scrim, and film, and applying the polymeric compound to at least one of the first and second surfaces of the substrate. The polymeric compound may be applied by conventional coating or laminating techniques. The method preferably further includes buffing the surface of the substrate including the polymeric compound thereon to adjust the thickness of the composite packing material to a predetermined gauge. The resulting composite packing material preferably has a thickness of at least 0.010 inches (0.25 mm) and is preferably substantially volume non-compressible. By "volume non-compressible," it is meant that the packing material maintains its original volume when subjected to a predetermined compressive force. The composite packing material also preferably has substantially the same elongation and tensile properties in the warp and fill direction.

In use, the composite packing material may be interposed between a printing blanket and a blanket cylinder to which the printing blanket is mounted.

Accordingly, it is a feature of the present invention to provide a composite packing material and method which is low in cost and which does not lose thickness over its useful life. Other features and advantages of the invention will be apparent from the following description, the accompanying drawings, and the appended claims.

DETAILED DESCRIPTION OF THE PREFERRED EMBODIMENTS

The composite packing material of the present invention provides a number of advantages over prior packing materials in that it has a greater thickness such that multiple layers of the material are not required. In addition, the composite packing material is low in cost to produce, and provides the desired gauge, gauge retention, elongation, and tensile strength properties needed to ensure good print quality and long life when used with a printing blanket in offset lithography applications.

Figure 1:
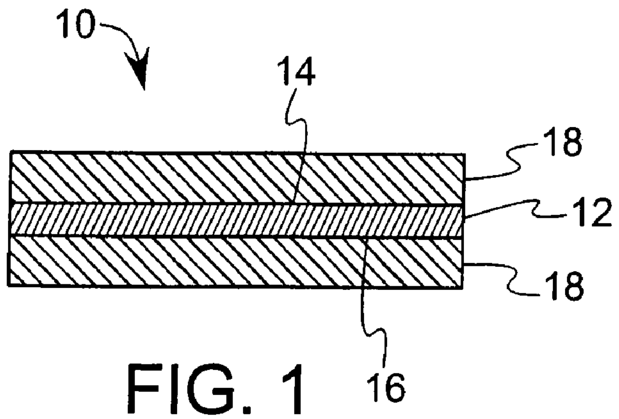
FIG. 1 is a cross-sectional view of a composite packing material in accordance with the present invention.

The composite packing material 10 is illustrated in FIG. 1 and includes a substrate 12 having first and second surfaces 14 and 16 which are preferably coated or laminated on both sides with a polymeric compound 18.

Figure 2:
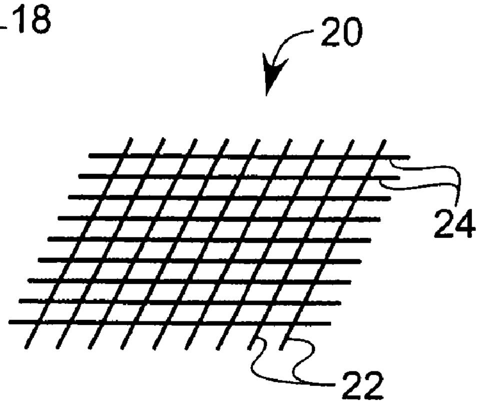
FIG. 2 illustrates the structure of the preferred substrate for use in the invention.

The preferred substrate for use in the present invention is a weft insertion fabric 20 as shown in FIG. 2 which is constructed with synthetic filament yarns of at least 1000 denier laid in a symmetrical 9×9 pattern (9 yarns/in. in the warp direction 22 and 9 yarns/in. in the fill direction 24). Such fabrics are commercially available. This balanced construction is preferred because the resulting open space between the yarns allows the polymeric compound, when applied to both surfaces, to mate through the openings and develop good adhesion without the need for adhesion promoters. If the weft insertion fabric is to be coated or laminated on one side only, a more closed structure is preferred and adhesion promoters may be required.

While the preferred arrangement of yarns is symmetrical, non-symmetrical arrangements may also be used by varying the count (i.e., number of yarns per unit, for example, number of yarns per inch in the warp and/or fill direction), denier, and type of yarns used in each direction such that the tensile and elongation properties are maintained at a roughly equivalent level in both the warp and fill directions. For example, lower denier yarns may be used if the count is increased to maintain the desired tensile and elongation properties. Higher denier yarns may also be used, with the count being correspondingly decreased.

The preferred tensile strength of the packing material is greater than 200 lbs, but it should be appreciated that the tensile strength may be substantially less if the packing material is inserted between the cylinder and printing blanket without tensioning. The preferred elongation is less than about 1.5% but could also be higher if the packing material is inserted without tensioning. While it is preferred that the tensile and elongation strengths be substantially the same in both the warp and fill directions, it should be appreciated that it is not critical that they be the same in order to achieve the desired properties.

The gauge of the substrate may vary depending on the denier and type of yarn used but is typically from about 0.010 inches to about 0.015 inches (about 0.25 to about 0.38 mm) for fabrics made of 1000 denier yarn. It should be appreciated that the gauge and gauge tolerance of the finished composite packing material are controlled by the amount of the polymeric coating and the subsequent buffing step.

While a weft insertion fabric is the preferred substrate, other substrate materials may be used including, but not limited to, woven and non-woven fabrics, scrims, films, and perforated films. While the substrate is preferably in the form of a single layer, it is also possible to combine multiple layers of fabrics and/or films into an integral packing material to achieve the desired thickness, elongation, and tensile strength properties. For example, non-woven fabrics may be used as cost effective space filling layers within, or on the outer surfaces of the composite packing material.

It is also possible to incorporate a compressible layer in the composite packing material. Such a compressible layer preferably comprises thermoplastic microspheres which may be incorporated into one of the polymeric compound layers or included as a separate layer between the substrate and the polymeric compound.

The preferred polymeric compound for use in the packing material of the present invention is a flexible polyvinyl chloride (PVC) compound. The PVC compounds should have a Shore A hardness ranging from about 60 to 80, and should have a compression set of less than about 25, more preferably, less than about 10, and most preferably, less than about 4. Such PVC compounds are commercially available. The PVC compounds may also be blended with other polymers such as nitrile rubber, acrylonitrile-butadiene-styrene (ABS), chlorinated polyethylene, and ethylene vinyl acetate. Other flexible polymeric compounds made from materials such as urethanes and synthetic rubbers may also be used as long as they exhibit the desired low compression set properties.

The polymeric compound is applied to the substrate in a conventional manner by coating or laminating and is preferably applied in a manner such that voids within the resulting layer(s) are minimized or avoided. Due to the open spaces, or interstices in the fabric, the resulting composite packing material may have a “dimpled” surface which can be removed by buffing the material in the final manufacturing step to provide substantially smooth surfaces on the composite. The buffing step also functions to adjust the overall gauge and achieve the necessary thickness tolerance.

Figure 3:
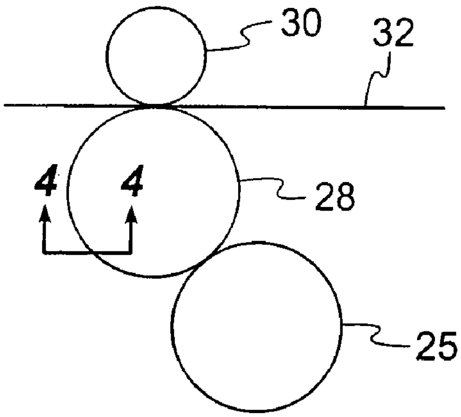
FIG. 3 illustrates an offset printing assembly utilizing the composite packing material.
Figure 4:
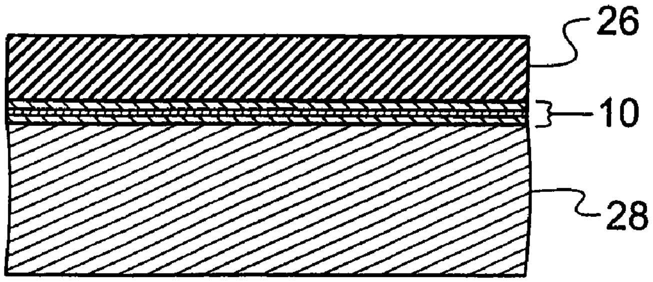
FIG. 4 illustrates the composite packing material mounted on a printing blanket cylinder taken along lines 4-4 of FIG. 3.

Referring now to FIGS. 3 and 4, the composite packing material 10 is illustrated in combination with a printing blanket construction on a printing cylinder. As shown in FIG. 4, the composite packing material 10 is positioned between a printing blanket 26 and a printing cylinder 28. In use, a rotary cylinder 25 covered with a printing plate containing ink is rotated so that it contacts cylinder 28 containing the printing blanket and composite packing material. The printing cylinder 28 then contacts a back-up cylinder 30, such that an image from the printing blanket can be transferred to a paper substrate 32 passed between the printing blanket cylinder and back-up cylinder.

Having described the invention in detail and by reference to preferred embodiments thereof, it will be apparent that modifications and variations are possible without departing from the scope of the invention.

What is claimed is:

1. In combination, a printing cylinder having an ink-receptive printing blanket thereon and including an integral composite packing material positioned between said printing blanket and said printing cylinder, said composite packing material comprising a substrate having first and second surfaces which is selected from the group consisting of fabric, scrim, and film; said substrate including a polymeric compound on at least one of said first and second surfaces which is selected from polyvinyl chloride, urethanes, compounded synthetic rubbers, and blends thereof.

2. The combination of claim 1 wherein said substrate comprises a weft insertion fabric comprising yarns of at least 1000 denier.

3. The combination of claim 1 wherein said polymeric compound comprise polyvinyl chloride.

4. The combination of claim 1 wherein said polyvinyl chloride has a Shore A hardness of from about 60 to about 80.

5. The combination of claim 1 wherein said polymeric compound has a compression set of less than about 25.

* * * * *